US010135958B2

(12) United States Patent
Mamas

(10) Patent No.: US 10,135,958 B2
(45) Date of Patent: Nov. 20, 2018

(54) WIRELESS MESSAGING SERVICES USING PUBLISH/SUBSCRIBE SYSTEMS

(75) Inventor: Evangelos Mamas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 10/492,095

(22) PCT Filed: Oct. 15, 2002

(86) PCT No.: PCT/GB02/04654
§ 371 (c)(1),
(2), (4) Date: Apr. 8, 2004

(87) PCT Pub. No.: WO03/043286
PCT Pub. Date: May 22, 2003

(65) Prior Publication Data
US 2004/0254993 A1 Dec. 16, 2004

(30) Foreign Application Priority Data

Nov. 13, 2001 (CA) ..................................... 2361861

(51) Int. Cl.
G06F 15/16 (2006.01)
H04L 29/08 (2006.01)
H04L 12/58 (2006.01)
H04L 12/18 (2006.01)
H04W 4/12 (2009.01)

(52) U.S. Cl.
CPC ............ H04L 69/329 (2013.01); H04L 51/38 (2013.01); H04L 67/04 (2013.01); H04L 67/26 (2013.01); H04L 67/2814 (2013.01); H04L 67/2828 (2013.01); H04L 67/2833 (2013.01);
(Continued)

(58) Field of Classification Search
CPC ..... H04L 51/38; H04L 67/26; H04L 67/2814; H04L 67/2828; H04L 67/04; H04L 67/2833; H04L 69/329; H04L 12/1859; H04L 12/189; H04L 67/2819; H04W 4/12
USPC .... 709/203–207, 217–219, 232, 230–232 H; 455/412.1, 445, 466
See application file for complete search history.

(56) References Cited

U.S. PATENT DOCUMENTS 6,047,327 A * 4/2000 Tso et al. ...................... 709/232
6,654,786 B1 * 11/2003 Fox et al. ...................... 709/203
(Continued)

FOREIGN PATENT DOCUMENTS

WO 97/41654 11/1997 ............... H04H 1/00
WO 00/77979 A 12/2000 ............. H04L 12/00
(Continued)

Primary Examiner — Abdullahi E Salad
(74) Attorney, Agent, or Firm — Steven M. Greenberg, Esq.; CRGO Law

(57) ABSTRACT

Message oriented middleware publish/subscribe technology and wireless push protocol is used to provide wireless messaging services for wireless devices. In the exemplary embodiment, a messaging system brokers messages between publisher applications (i.e. content providers) and wireless client devices (i.e. content subscribers), receiving and distributing messages to subscribers having subscribed to particular content. Messages are pushed to clients via a wireless gateway using a wireless push protocol. Message content subscription is used to filter messages to subscribers with fine granularity to provide a higher quality of service.

6 Claims, 9 Drawing Sheets

(52) U.S. Cl.
CPC ........ *H04L 12/189* (2013.01); *H04L 12/1859* (2013.01); *H04L 67/2819* (2013.01); *H04W 4/12* (2013.01)

(56) References Cited

U.S. PATENT DOCUMENTS

| | | | |
|---|---|---|---|
| 6,778,834 B2* | 8/2004 | Laitinen et al. | 455/450 |
| 7,212,811 B2* | 5/2007 | Dowling et al. | 455/414.1 |
| 7,392,306 B1* | 6/2008 | Donner et al. | 709/224 |
| 7,856,420 B2* | 12/2010 | Zargham et al. | 707/627 |
| 2002/0024536 A1* | 2/2002 | Kahan et al. | 345/745 |
| 2002/0155848 A1* | 10/2002 | Suryanarayana | 455/466 |
| 2004/0237109 A1* | 11/2004 | Laitinen et al. | 725/62 |

FOREIGN PATENT DOCUMENTS

| | | | |
|---|---|---|---|
| WO | 00/78067 A | 12/2000 | H04Q 7/22 |
| WO | 00/78068 A | 12/2000 | H04Q 7/22 |
| WO | WO 00/78067 * | 12/2000 | H04Q 7/22 |
| WO | 01/59572 A | 8/2001 | G06F 11/32 |
| WO | 01/63844 A | 8/2001 | H04L 12/28 |

\* cited by examiner

16' 6 Mendieta Valencia!

WIRELESS MESSAGING SERVICES USING PUBLISH/SUBSCRIBE SYSTEMS

TECHNICAL FIELD

The invention relates to wireless messaging services for wireless application enabled devices using publish/subscribe systems.

BACKGROUND OF THE INVENTION

The wireless telecommunications market has experienced rapid growth over the past few years and that growth is projected to generally continue for the foreseeable future. Increasingly, wireless devices are becoming more sophisticated and capable of supporting wireless applications. The growth in the sales of wireless devices is fuelling the simultaneous growth for a wide range of wireless services for wireless application ready devices such as banking, shopping, and e-mailing and, particularly, new location-based services.

A challenge exists for those who are building wireless services as the services must be reliable and scalable and meet user demands. At first, building such services might appear to be a very simple task that a service provider alone may try to tackle by developing a complete solution from one end to the other. However, as wireless services grow in size, more cost effective and reliable solutions will be necessary.

Message-oriented middleware (MOM), for example, a message queuing (MQ) system, provides asynchronous message transfer services between applications. Such systems enable applications to exchange information in a time independent fashion, without requiring that the source and destination applications be concurrently active.

Various software companies have developed commercial MOM products: the MQSeries® message queuing system from International Business Machines Corporation is one such product developed for heterogeneous any-to-any connectivity from desktop to mainframe. A comprehensive family of application programming interfaces (APIs) are designed to make coding for any messaging task straightforward, enabling system integrators to focus on the business logic rather than on operating system specific details. Message and transference integrity is another key feature of MQSeries, as a once-only message delivery is always assured—even when the underlying applications or networks fail.

In a typical MOM integration scenario, two or more applications exchange information in an asynchronous manner via a MQ system network of one or more nodes. The applications communicate by putting and getting messages from queues. Messages are stored at intermediate queues in the network until the MQ system is able to process them. Messages are routed toward the destination application and held in a final queue until the destination application retrieves the message.

A queue at a node is managed by a component known as a queue manager. The queue manager provides the necessary services to applications that use the queue (e.g. putting and getting) and communicates with other queue managers to route messages to correct queues. In order to accommodate the needs of critical business applications, MQSeries provides support for transactional messaging, secure messaging, triggering mechanisms and thin clients. MQ systems are flexible and versatile, permitting a single queue to work with several applications. Operation of the MQ system network is transparent to the source and destination application as each need only be concerned with interfacing to a high-level API. In addition to providing an API that may be particular to a specific MQ system, a MQ system may provide APIs in accordance with the Java™ Message Service (JMS) specification of Sun Microsystems, Inc., conveniently extending the MQ system to Java-based applications and components.

Further flexibility and versatility is provided in the MQSeries product line through MQSeries Integrator (version 1.1). Built on top of the basic MQSeries messaging framework, MQSeries Integrator is a powerful information broker that selects and distributes information to the applications, databases and users that need it. MQSeries Integrator builds new or extends existing messaging solutions, enabling customized message processing. MQSeries Integrator provides both the MQSeries messaging layer and a message brokering hub for processing, transforming and distributing messages, and, optionally, combining these features with a publish/subscribe function. By enabling customized message routing and transformation of message content, MQSeries Integrator separates business logic from application logic and/or data logic.

A key concept used in MQSeries Integrator is that of a message flow. A message flow is a visual representation, like a wire diagram, in a graphical development environment of how a message is transformed while "flowing" between queues. Message Brokers (brokers) act as a way station, or a hub, for messages passing between MQSeries applications. Once messages have reached the broker, they can then be processed in accordance with the configuration of the broker and the contents of the message. Within the broker, individual functions are assigned to a notional collection of interconnected nodes (e.g. dynamic linked libraries (DLLS) called from the broker's execution environment), where the processing and transformation activities can take place as required. In addition to basic nodes that MQSeries Integrator provides to process, transform or distribute messages, customized nodes may be provisioned to further enhance message flow capabilities. An exemplary message flow scenario in accordance with the prior art is illustrated in FIG. 1.

One additional feature of MQSeries Integrator and other MOM of particular importance is publish/subscribe functionality. A publish/subscribe system is responsible for distributing message-based information from publisher applications to subscriber applications by means of selected topics. In a publish/subscribe system, a publisher is a supplier of information defined by a topic. A subscriber is a receiver of information on topics of interest and may also be a forwarder of the information to other interested subscribers. A topic is the subject of the information that is contained in a message and a stream is a grouping of related topics. Streams are useful for providing access control to topics. Finally, a broker is a service that controls and routes the messages from the publishers to the subscribers.

The publish/subscribe paradigm further enables the de-coupling of applications that provide information from applications that consume information. For publisher applications, information can be made available without needing to know who has requested or will request it and, therefore, to whom to send the information. For subscriber applications, a publish/subscribe system's functionality is greatly enhanced by increasing the refinement of the selection criteria. There may be many messages published for a topic that are not desired by particular subscribers, even when the topic matches the subscriber's general criteria. MQSeries Integrator allows content-based subscription and improves the refinement of the selection of the messages to be sent to subscribers, so that a more selective and therefore more efficient method of distributing information is provided.

A simple publish/subscribe system 10 in accordance with the prior art is illustrated in FIG. 2. A set of publisher applications (publishers) (collectively, 12) provide information in data messages according to topics to one or more subscriber applications (subscribers) (collectively, 14) that have expressed their interest in the topics. Between publishers 12 and subscribers 14, there is a publish/subscribe data processing broker network having a plurality of broker computer systems 16 (brokers) communicating with each other via the network that manage and route the messages from publishers 12 to subscribers 14. It is important to observe that more than one broker can coexist in system 10, enabling scalability through the forwarding of messages to each other.

The relationships between publishers 12, subscribers 14 and brokers 16 of system 10 in FIG. 2 may be summarized as follows:

Publisher and Broker
- Publishers can register to publish information to one of the brokers on a specific topic;
- Publishers can send messages to a broker;
- Publishers can request the deletion of messages retained by the brokers; and
- Publishers can de-register with a broker.

Subscriber and Broker
- Subscribers can register with one of the brokers for one or more topics of interest to the subscribers;
- Brokers can send the information to each subscriber based on the registrations; and
- Subscribers can de-register with the brokers.

Broker and Broker
- Brokers can exchange subscription registrations and de-registrations;
- Brokers can exchange publications and delete requests; and
- Brokers can exchange information about themselves.

As noted MOM facilitates messaging among applications. One application area experiencing major change is the area of wireless applications. The Wireless Application Protocol (WAP) specifies an application framework and a set of network protocols for providing Internet communications and advanced telephony services on a wide range of wireless devices such as digital mobile phones, pagers, personal data assistants and other wireless terminals. The WAP specification attempts to extend and re-use existing mobile networking technologies as well as Internet technologies. The motivation behind WAP is to enable devices with limited resources (power, CPU, memory, display size, etc.) that operate in wireless data networks with limited capabilities (bandwidth, latency, connection stability, availability) to access the World Wide Web.

According to the classical World Wide Web client/server model, a client uses a web browser to initiate a request, or pull for content, to a web server. The web server responds to the client request by sending the requested content in a response. WAP accommodates the pull model, extending the web architecture by adding telephony support with Wireless Telephony Access (WTA). Moreover, WAP enables a "push" model where a server can proactively send content to the client.

In a typical WAP configuration, illustrated in FIG. 3, an additional layer is deployed between client and web server for facilitating communication of web information wirelessly. A WAP Proxy Gateway provides the extra layer and is responsible for translating requests from a WAP protocol stack to an HTTP protocol stack and vice-versa. The WAP Proxy Gateway is also useful for encoding and translating content into more compact formats suitable for wireless networks. Recent WAP protocols do not require a WAP Proxy Gateway in all circumstances since client and web server communications may be conducted using HTTP/1.1 supporting wireless communications. However, a WAP Proxy Gateway can optimize the communication process and may offer mobile service enhancements such as privacy, location and presence based services. A WAP Proxy Gateway is necessary, however, to offer push functionality.

A push operation between a Push Initiator (PI) and WAP client is performed by permitting PI to transmit push content and delivery control instructions to a WAP Push Proxy Gateway (PPG) which then delivers the push content to the WAP client according to the delivery instructions. PI may be configured as an application running on an ordinary web server. PI and PPG may be configured as separate entities or co-located. Co-location supports PPG operator services, large service providers, and scenarios requiring transport level end-to-end security among other requirements or benefits.

PI communicates with PPG using a protocol known as Push Access Protocol (PAP). To deliver push content to the client, PPG uses a protocol known as Push Over-The-Air (OTA) Protocol. PAP is based on standard Internet protocols; XML is used to express the delivery instructions, and the push content can be any MIME (multipurpose Internet mail extensions) media type. These standards help make WAP push flexible and extensible.

PPG does most of the work for push communications since it is responsible for routing the push content to the client. PPG has the ability to perform authentication and access control, address resolution, protocol conversion, binary encoding, and content filtering among other tasks. It may query for a specific wireless client's capabilities and provide the results to an inquiring PI, in order to aid in creating better formatted content. A PPG can also perform broadcasting or multicasting of messages.

PAP supports the following operations:
- Push Submission (PI to PPG)
- Push Notification (PPG to PI)
- Push Cancellation (PI to PPG)
- Status Query (PI to PPG)
- Client Capabilities Query (PI to PPG)

PAP can be tunneled through HTTP for compatibility with existing Internet infrastructure.

OTA is responsible for transporting the data from PPG to the wireless client using a WAP Session Protocol (WSP) in either a connection oriented or connection-less manner.

Push message content is divided into several parts and contains control information for the PPG. Control information includes recipient address(es), delivery time constraints, Quality of Service (QoS) information, notification requests, etc.

In operation, PPG acknowledges successful or reports unsuccessful parsing of the control information to the originating PI. Debug information about the push content itself may optionally be reported. Once the content has been accepted for delivery, PPG looks for the correct client and delivers the content to that client. Push content timeout parameters may be used to limit PPG delivery attempts. Such timeouts may be set by the PI and/or policies of the PPG operator.

Upon request of the PI, the PPG may also send a notification when the final status of the push submission (delivered, cancelled, expired, etc.) has been determined. As discussed previously with respect to message queuing systems, push services between PI and PPG are asynchronous from PI's point of view as PI is not required to wait on-line for PPG to complete its delivery.

The WAP push framework permits any MIME media type to be delivered between PI and client. Additional media types have been defined by the WAP standard to add capabilities not already provided by existing MIME types. In particular, the Service Indication (SI) MIME media type provides the ability to send notifications to end-users in an asynchronous manner. Such notifications may, for example, relate to new e-mails, changes in stock price, news headlines, advertising, reminders of low prepaid balance, etc.

In its most basic form, an SI contains a short message and a URI (uniform resource identifier) indicating a service. The message is presented to the client end-user upon reception, and the user is given the choice to either initiate the service indicated by the URI immediately, or postpone it for later handling. If the SI is postponed, it is stored by the client device. SI is presently the only mandatory WAP push framework media type.

The SI specification provides various mechanisms for improving the end user experience such as: User-Intrusiveness levels, Deletion of invalid SIs, Replacement of expired SIs, Handling for out of order delivery, and Expiration of SIs.

An example of how Service Indication can be used is user notification for new emails. Typically, a wireless email service provider provides a WML web site to allow a user to navigate through the user's email program. When a new email arrives at the web server, preferably, the user is notified. A service indication is sent to the user, such as a text message (e.g. "You have 1 new email") and a URI, that allows the user to directly go to the WML site to browse the new email.

In some cases it is not suitable to wait for a client to respond to the service indication. For such cases, it is more suitable that the client device loads the service that is indicated by the push message without requiring a user input. Service Loading ("SL") is an additional MIME media type that conveys an URI that points to some content to be loaded by the client without end-user confirmation. SL also includes an instruction whether the content should be executed and/or rendered or placed in the client cache. If the content should be executed and/or rendered, PI can control the level of user-intrusiveness.

For example, SL can be used when a user with a prepaid wireless telephony service subscription is coming to the end of their prepaid funds during a phone call. In such a scenario, it may be more appropriate to have the wireless device load the service that is used for allowing the user to add more funds to the prepaid subscription than to disconnect the call. Once the service is loaded and the appropriate information is transferred the user can select the appropriate action, such as by pressing a button. If Service Indication is used instead, the user is required to first accept the service, load it and then proceed to add more funds.

Wireless messaging applications may be supported under alternate protocols other than WAP. For example, NTT DoCoMo, Inc. of Japan has commercialized i-mode™ wireless services providing wireless e-mail, web browsing, message services and other features for wireless telephone devices using packet data transmission. FIG. 4 illustrates a block diagram of the i-mode model. While there are many similarities between WAP and the protocol of current i-mode services, one difference is in the area of web page description languages. WAP specifies WML while i-mode presently uses a compact HTML (cHTML) similar to ordinary HTML based Internet web sites. NTT DoCoMo's i-mode also provides support for wireless push messages.

To provide new wireless services or to extend legacy services to a wireless environment, cost-effective, reliable and scalable solutions that will meet the user demands are required.

SUMMARY OF THE INVENTION

In accordance with an aspect of the invention there is provided a method of brokering messages between a publisher application and at least one wireless subscriber. The method comprises steps of receiving a data message published on a topic, the data message originating from the publisher application; and using a wireless push protocol to distribute a message for a subscriber that has subscribed for messages on the topic about which the data message was published.

Preferably, the step of using the wireless push protocol to distribute a message comprises a further step of filtering the data message according to the topic about which the data message was published. Further, preferably, the step of filtering the data message uses business logic related to the topic of the data message, a content of the data message and a subscription of the subscriber. The business logic controls the flow of the message in accordance with an embodiment of the method.

In accordance with a feature of the invention, the step of using the wireless push protocol to distribute comprises converting the message to a push message format using a wireless push protocol before delivering the message to a wireless gateway. Preferably, the converted message delivered to the wireless gateway includes a MIME part that conforms to a service indication media type or a service loading media type.

The method may further include a step of receiving a subscriber data message comprising a subscription request from the subscriber requesting that the subscriber receive messages on the topic upon which the data message is published by wireless delivery using a push protocol. The subscriber message may be received from a user application for facilitating subscription requests and preferably further includes a step of providing topic data to the web user application that communicates the topic data to the subscriber. The topic data may be dynamically mapped by the user application to pages to be displayed by a wireless device before the topic data is communicated to the subscriber.

The method may further include a step of receiving a data message from the publisher application where the data message comprises a publication request to publish data messages on the topic. Preferably, the topic data to be provided to subscribers is stored and provided to a user application that communicates the topic data to subscribers.

In accordance with an embodiment of the invention, the method is performed within a publish/subscribe data processing broker network having a plurality of broker computer systems that communicate with each other through the network.

In accordance with a further embodiment, the method further includes steps of receiving the message at a wireless gateway and forwarding the message to the subscriber by wireless delivery using a wireless push protocol.

In accordance with yet another embodiment the method further comprises a step of publishing the data message related to the topic by a publisher application.

In accordance with another embodiment the method further comprises a step of generating a subscriber message from a web user application for facilitating subscription requests.

Preferably, according to the method of the invention, the message distributed to the subscriber notifies the subscriber that an asynchronous event has occurred and indicates a service that can be initiated in order to react to the event or the message distributed to the subscriber indicates a service to be loaded in accordance with a level of user intrusiveness.

The method preferably comprises receiving a data message published on a topic, the data message originating from the publisher application; and using a wireless push protocol to distribute a message for a subscriber that has subscribed for messages on the topic about which the data message was published wherein the step of using the wireless push protocol to distribute includes converting the message to a push message format using a wireless push protocol before delivering the message to a wireless gateway.

Preferably, the converted message delivered to the wireless gateway includes a MIME part that conforms to a service indication media type or a service loading media.

The method preferably comprises receiving the message at a wireless gateway; and forwarding the message to the subscriber by wireless delivery using a wireless push protocol.

The method preferably comprises receiving a data message published on a topic, the data message originating from the publisher application; providing topic data to a user application for facilitating subscription requests wherein the topic data is dynamically mapped by the user application to pages for displaying on a wireless device before the topic data is communicated to the subscriber; receiving a subscriber data message from the user application, the subscriber data message comprising a subscription request from the subscriber requesting that the subscriber receive messages on the topic upon which the data message is published by wireless delivery using a push protocol; and using a wireless push protocol to distribute a message for the subscriber that has subscribed for messages on the topic about which the data message was published.

The method preferably comprises receiving a data message from the publisher application, the data message comprising a publication request to publish data messages on the topic.

A computer readable medium may contain executable program instructions for enabling a computer system to broker messages between at least one publisher application and at least one wireless subscriber, comprising: program instructions for receiving a data message published on a topic, the data message originating from a publisher application; and program instructions for distributing a message related to the topic to a subscriber that has subscribed to receive messages on the topic, the subscribed messages being distributed using wireless push protocol.

The computer readable medium may be one wherein the program instructions for distributing comprises program instructions for filtering data messages by topic.

The computer readable medium may be one wherein the program instructions for distributing comprises program instructions for filtering the data message using business logic based on the topic of the data message, a content of the data message and a subscription of the subscriber.

The computer readable medium may be one wherein the business logic controls the flow of the message.

The computer readable medium may be one further comprising program instructions for receiving a subscriber subscription request to receive by wireless delivery using a push protocol, messages on the topic on which the data message is published.

The computer readable medium may be one wherein the subscriber message is received from a user application for facilitating subscription requests.

The computer readable medium may be one further comprising program instructions for receiving a data message comprising a publication request to publish data messages on the topic, said data message originating from the publisher application.

The computer readable medium may be one further comprising program instructions for storing the topic data to permit the topic to be provided to subscribers.

The computer readable medium may be one further comprising program instructions for providing the topic data to a user application to permit the topic data to be communicated to subscribers.

The computer readable medium may be one further comprising program instructions for publishing the data message on the topic.

A computer readable medium may contain executable program instructions for enabling a computer system to broker messages between at least one publisher application and at least one wireless subscriber, comprising: program instructions for receiving a data message published on a topic, the data message originating from a publisher application; and program instructions for distributing a message related to the topic to a subscriber that has subscribed to receive messages on the topic, the subscribed messages being distributed using wireless push protocol wherein the program instructions for distributing include program instructions for converting the message to a push message format for delivering the message to a wireless gateway using a wireless push protocol.

The computer readable medium may be one wherein the message for delivery to the wireless gateway includes a MIME part that conforms to a service indication media type or a service loading media type.

The computer readable medium may be one containing executable program instructions for enabling a computer system to broker messages between a publisher application and at least one wireless subscriber comprising: program instructions for receiving a data message published on a topic, the data message originating from the publisher application; program instructions for providing topic data to a user application for facilitating subscription requests wherein the topic data is dynamically mapped by the user application to pages for displaying on a wireless device before the topic data is communicated to the subscriber; program instructions for receiving a subscriber data message from the user application, the subscriber data message comprising a subscription request from the subscriber requesting that the subscriber receive messages on the topic upon which the data message is published by wireless delivery using a push protocol; and program instructions for using a wireless push protocol to distribute a message for the subscriber that has subscribed for messages on the topic about which the data message was published.

The computer readable medium may be one further comprising program instructions for receiving a data message comprising a publication request to publish data messages on the topic, said data message originating from the publisher application.

According to one aspect of the invention, a computer system for brokering messages between at least one publisher application and at least one wireless subscriber is provided, the computer system comprising: means for receiving a data message published on a topic, the data message originating from a publisher application; and means for distributing a message to a subscriber that has subscribed to receive messages on the topic about which the data message was published, using wireless delivery and a wireless push protocol.

The computer system may be one wherein the means for distributing comprises means for filtering published data messages according to the topic.

The computer system may be one wherein the means for distributing comprises means for filtering the data message using business logic based on the topic of the data message, a content of the data message and a subscription of the subscriber.

The computer system may be one wherein the business logic controls the flow of the message.

The computer system may be one further comprising means for receiving a subscription request message from the subscriber, requesting to receive by wireless delivery using the push protocol, messages about the topic on which the data message is published.40. The computer system as claimed in claim 39 wherein the subscriber message is received from a user application for facilitating subscription requests.

The computer system may be one further comprising means for receiving a message publication request to publish data messages on the topic, the message originating from the publisher application.

The computer system may be one further comprising means for storing the topic data to be provided to subscribers.

The computer system may be one further comprising means for providing the topic data to a user application which communicates the topic data to subscribers.

The computer system may be one wherein the computer system comprises a plurality of publish/subscribe data processing broker computer systems that communicate with each other via a network.

The computer system may be one further comprising means for publishing the data message on the topic received from a publisher application.

A computer system for brokering messages between at least one publisher application and at least one wireless subscriber may comprise means for receiving a data message published on a topic, the data message originating from a publisher application; and means for distributing a message to a subscriber that has subscribed to receive messages on the topic about which the data message was published, using wireless delivery and a wireless push protocol wherein the means for distributing comprise means for converting the message to a push message format for delivering the message to a wireless gateway using the wireless push protocol.

The computer system may be one wherein the message for delivering to the wireless gateway comprises a MIME part that conforms to a service indication media type or a service loading media type.

The computer system may be one further comprising means for receiving the message at a wireless gateway and forwarding the message to the subscriber by wireless delivery using a wireless push protocol.

A computer system for brokering messages between a publisher application and at least one wireless subscriber may comprise: means for receiving a data message published on a topic, the data message originating from the publisher application; means for providing topic data to a user application for facilitating subscription requests wherein the topic data is dynamically mapped by the user application to pages for displaying on a wireless device before the topic data is communicated to the subscriber; means for receiving a subscriber data message from the user application, the subscriber data message comprising a subscription request from the subscriber receive messages on the topic upon which the data message is published by wireless delivery using a push protocol; and means for using a wireless push protocol to distribute a message for the subscriber that has subscribed for messages on the topic about which the data message was published.

The computer system may be one further comprising means for receiving a message publication request to publish data messages on the topic, the message originating from the publisher application.

Preferably, a method of publishing messages to a wireless subscriber comprises the step of: publishing a data message on a topic received from a publisher application by a publish/subscribe data processing broker computer system, the data message being distributed by the broker computer system to a subscriber that has subscribed for messages on the topic, and the subscribed message is distributed to the subscriber via wireless delivery using a wireless push protocol.

Preferably, a wireless gateway for brokering messages between a publisher application and a wireless subscriber comprises means for receiving a data message published on a topic, the data message originating from a publisher application; means for filtering the data message for a wireless subscriber that has subscribed to receive messages on the topic on which the data message was published; and means for delivering the data message to the wireless subscriber via wireless delivery using a wireless push protocol.

The wireless gateway may be one further including means for converting the data message to a push message that conforms to the wireless push protocol before the message is delivered to the wireless subscriber.

In accordance with another aspect of the invention, there is provided a computer readable medium containing executable program instructions for enabling a computer system to broker messages between at least one publisher application and at least one wireless subscriber. The computer readable medium comprises program instructions for receiving a data message published on a topic where the data message originates from a publisher application; and program instructions for distributing a message related to the topic to a subscriber that has subscribed to receive messages on the topic where the subscribed messages are distributed using wireless push protocol.

In accordance with a further aspect of the invention, there is provided a method of publishing messages to a wireless subscriber. The method comprises the step of publishing a data message on a topic received from a publisher application by a publish/subscribe data processing broker computer system where the data message is distributed by the broker computer system to a subscriber that has subscribed for messages on the topic and the subscribed message is distributed to the subscriber via wireless delivery using a wireless push protocol.

In accordance with yet another aspect of the invention, there is provided a wireless gateway for brokering messages between a publisher application and a wireless subscriber. The wireless gateway comprises means for receiving a data message published on a topic where the data message originating from a publisher application; means for filtering the data message for a wireless subscriber that has subscribed to receive messages on the topic on which the data message was published; and means for delivering the data message to the wireless subscriber via wireless delivery using a wireless push protocol.

The wireless gateway may further include means for converting the data message to a push message that conforms to the wireless push protocol before the message is delivered to the wireless subscriber.

It is thus advantageous to provide a method and apparatus for providing wireless message services using publish/subscribe systems.

BRIEF DESCRIPTION OF THE DRAWINGS

A preferred embodiment of the the present invention will now be described, by way of example only, with reference to the appended drawings, in which.

Throughout the appended drawings, like features are identified by like reference numerals.

DETAILED DESCRIPTION OF THE PREFERRED EMBODIMENT

Figure 5:
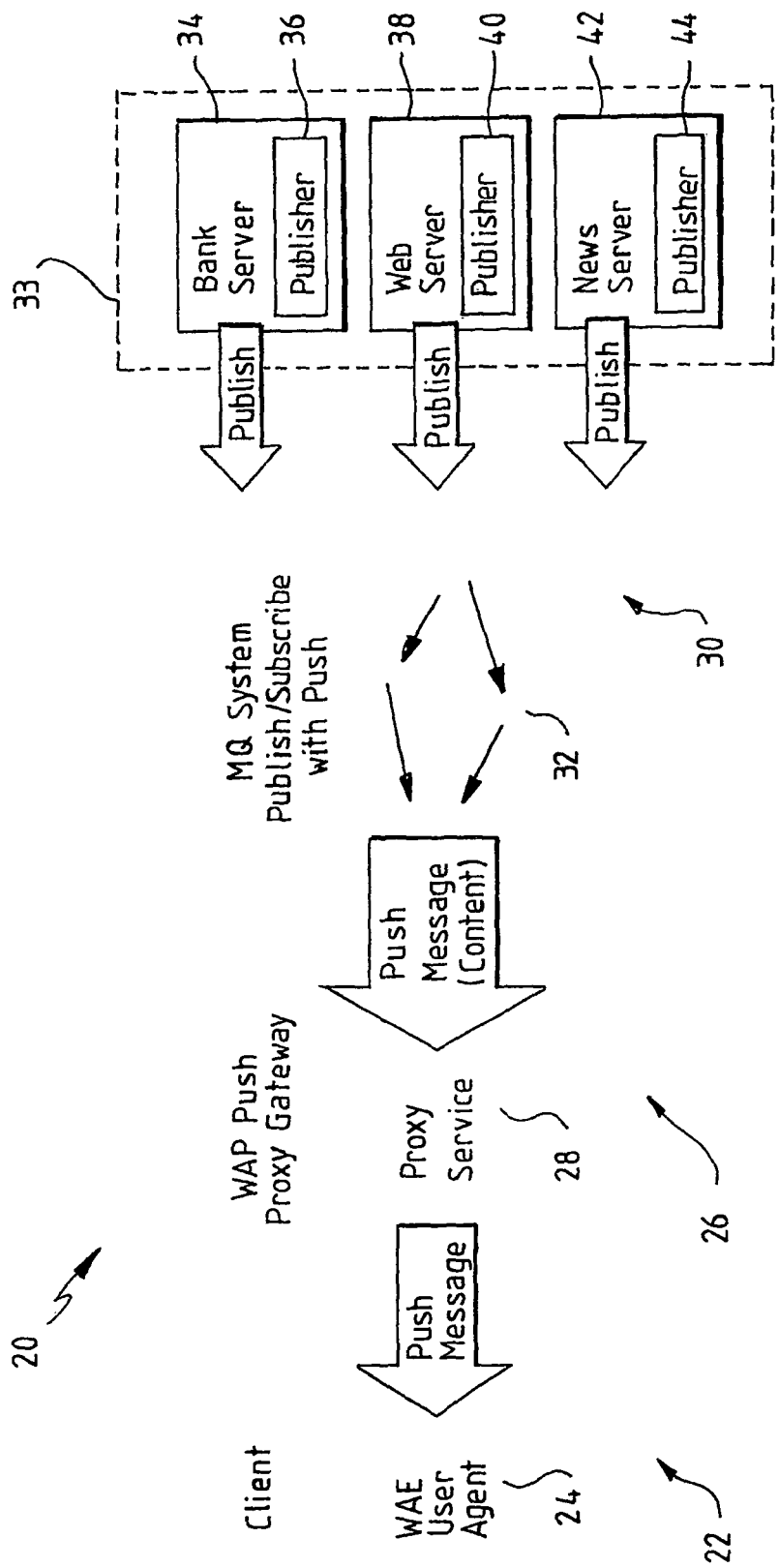
FIG. 5 is a block diagram of a wireless messaging service in accordance with a preferred embodiment of the invention using WAP and a message queuing system.

FIG. 5 illustrates a preferred system 20 for wireless messaging services using WAP and a message queuing system. A client wireless device 22 (client), such as a digital mobile telephone, PDA, pager or other wireless terminal is coupled for wireless communication with a WAP Push Proxy Gateway 26 (PPG). PPG 26 is coupled for communication with message queuing (MQ) system 30 comprised of one or more nodes 32 implementing a combined publish/subscribe and push paradigm. MQ system 30 is coupled for communication with one or more servers (collectively, 33) configured with respective applications for providing message content such as the exemplary bank server 34, web server 38 and news server 42.

Client 22 is a typical WAP-enabled device and includes a user agent within a Wireless Application Environment (WAE) 24 for web browsing and push message communication.

PPG 26 comprises a server configured with a proxy application 28 for providing proxy services between clients and web applications and/or push message providers (e.g. push initiators) over wired and wireless networks. Wireless communication between client 22 and PPG 26 is conducted in accordance with wireless protocols including a protocol for wireless push messaging such as Push Over the Air (OTA) protocol and, optionally, a protocol for web browsing such as HTTP/1.1. Communication between PPG 26 and MQ system 30 is conducted over a wired network primarily in accordance with a protocol for push messaging, such as Push Access Protocol (PAP) and, optionally, a protocol for web browsing such as HTTP/1.1. As noted above, a WAP gateway, such as PPG 26, is preferably deployed between a client and a web application for web browsing communications. However, the WAP gateway is not required by the WAP standard.

Figure 1:
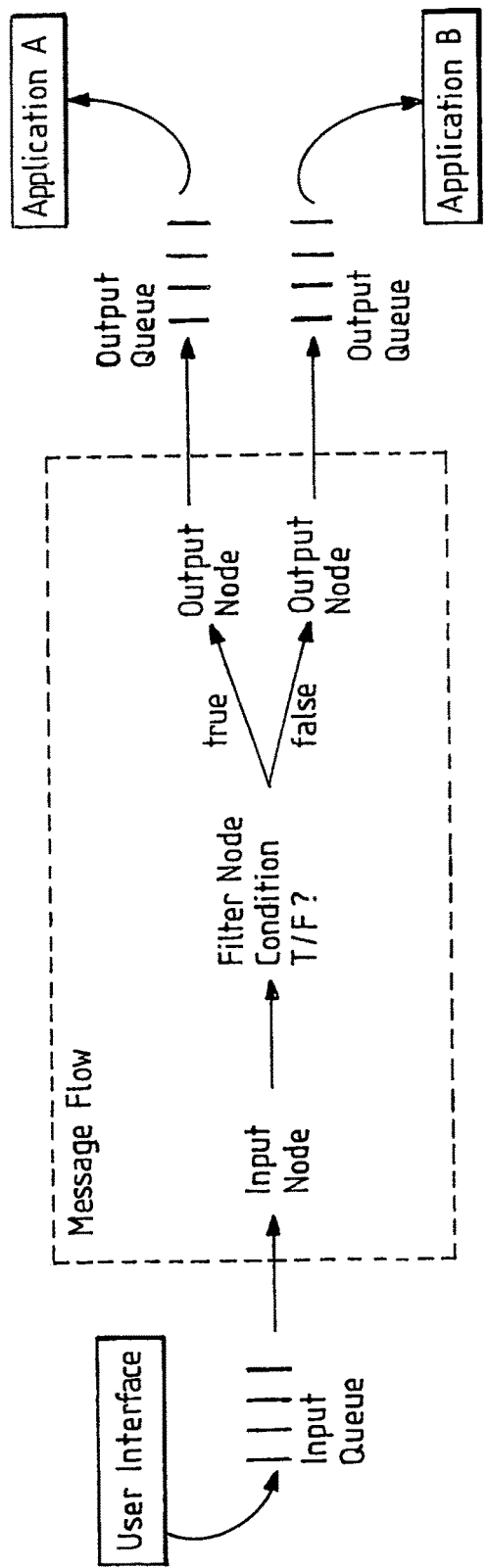
FIG. 1 is a block diagram of an exemplary message flow in a message queuing system in accordance with the prior art.
Figure 2:
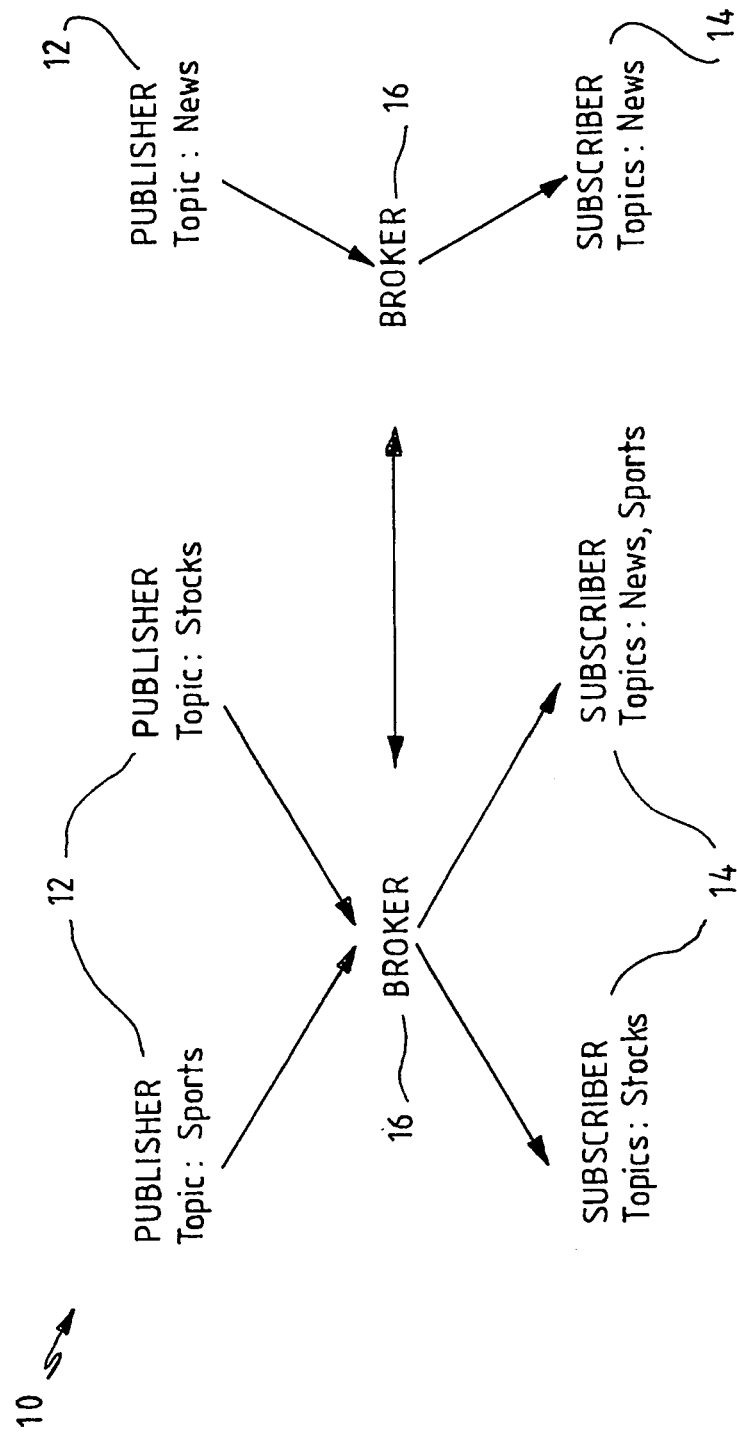
FIG. 2 is a block diagram of a publish/subscribe system in accordance with the prior art.
Figure 3:
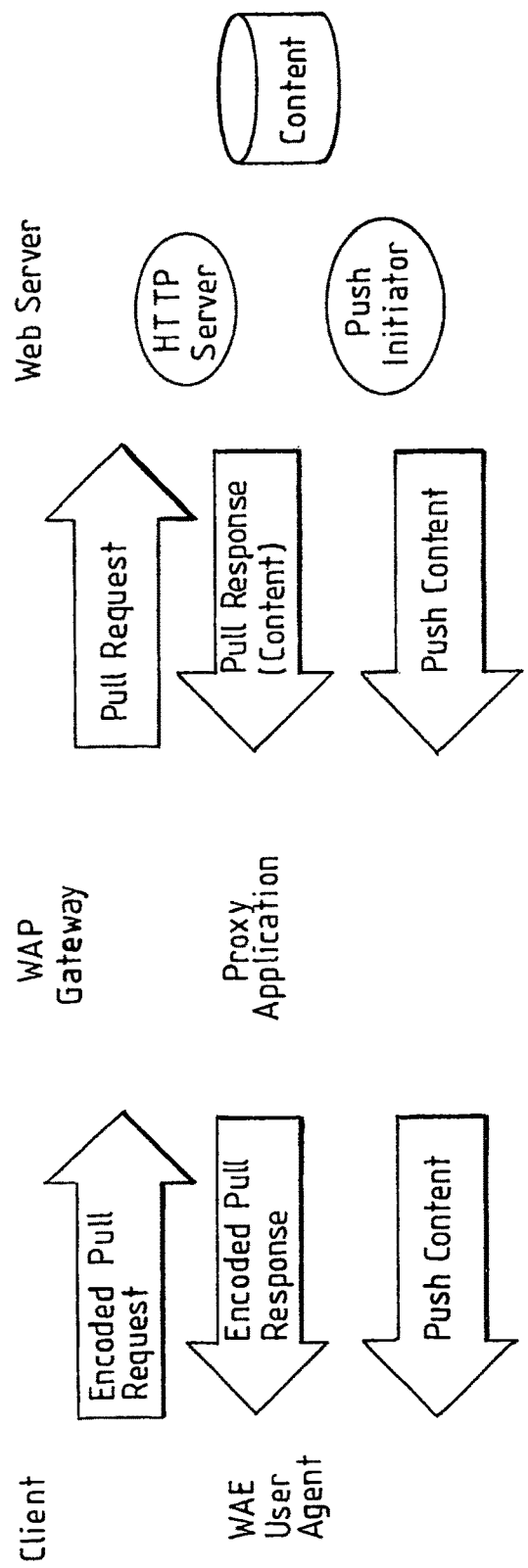
FIG. 3 is a block diagram of a WAP model for client/server communications showing push and pull frameworks in accordance with the prior art.
Figure 4:
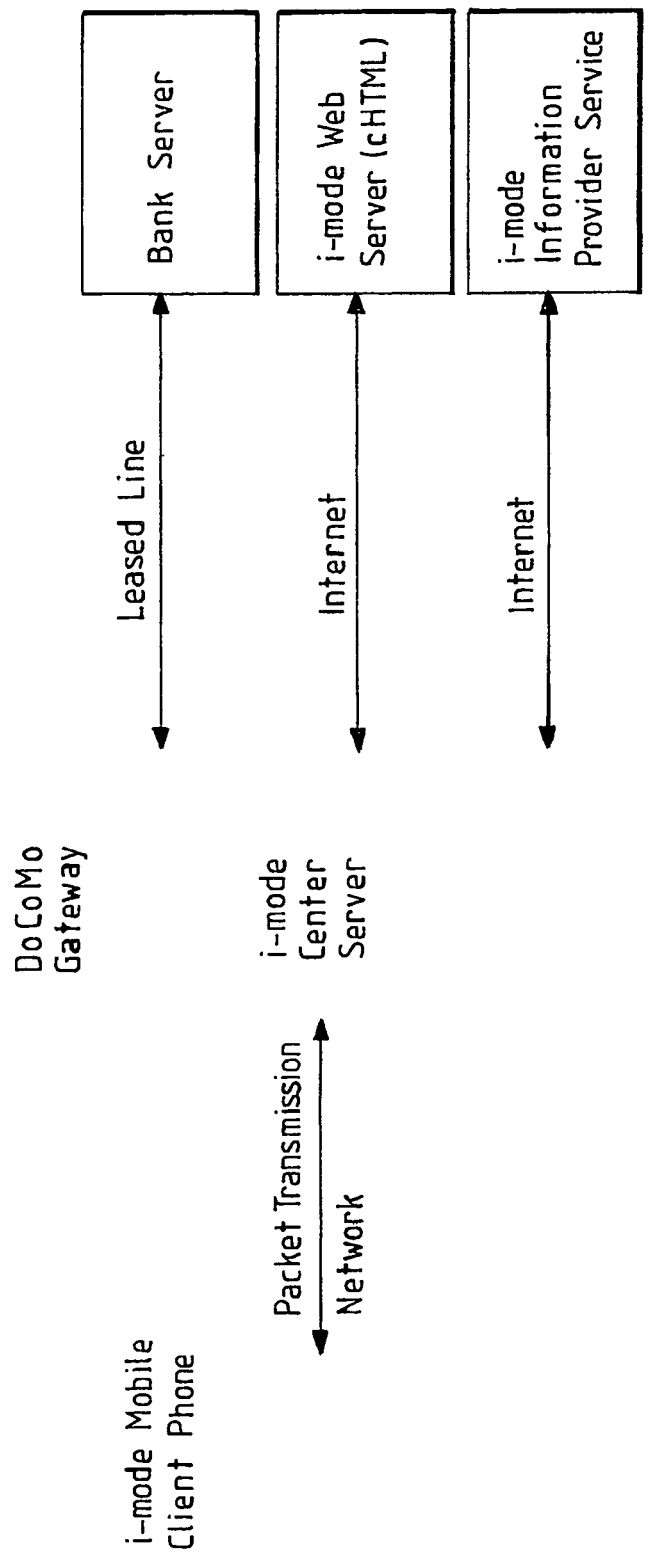
FIG. 4 is a block diagram of an i-mode model for client/server communications in accordance with the prior art.

In accordance with the prior art and discussed with reference to FIGS. 1 and 2, each of servers 33 is configured for publishing messages to a broker in MQ system 30.

MQ system 30 includes one or more servers configured for brokering messages between publisher applications 34, 38 and 42 and subscribers such as subscriber client 22. MQ system 30 provides brokering services according to the publish/subscribe paradigm, deploying push technology to communicate specific content messages to subscriber clients that have subscribed to the content.

Figure 6:
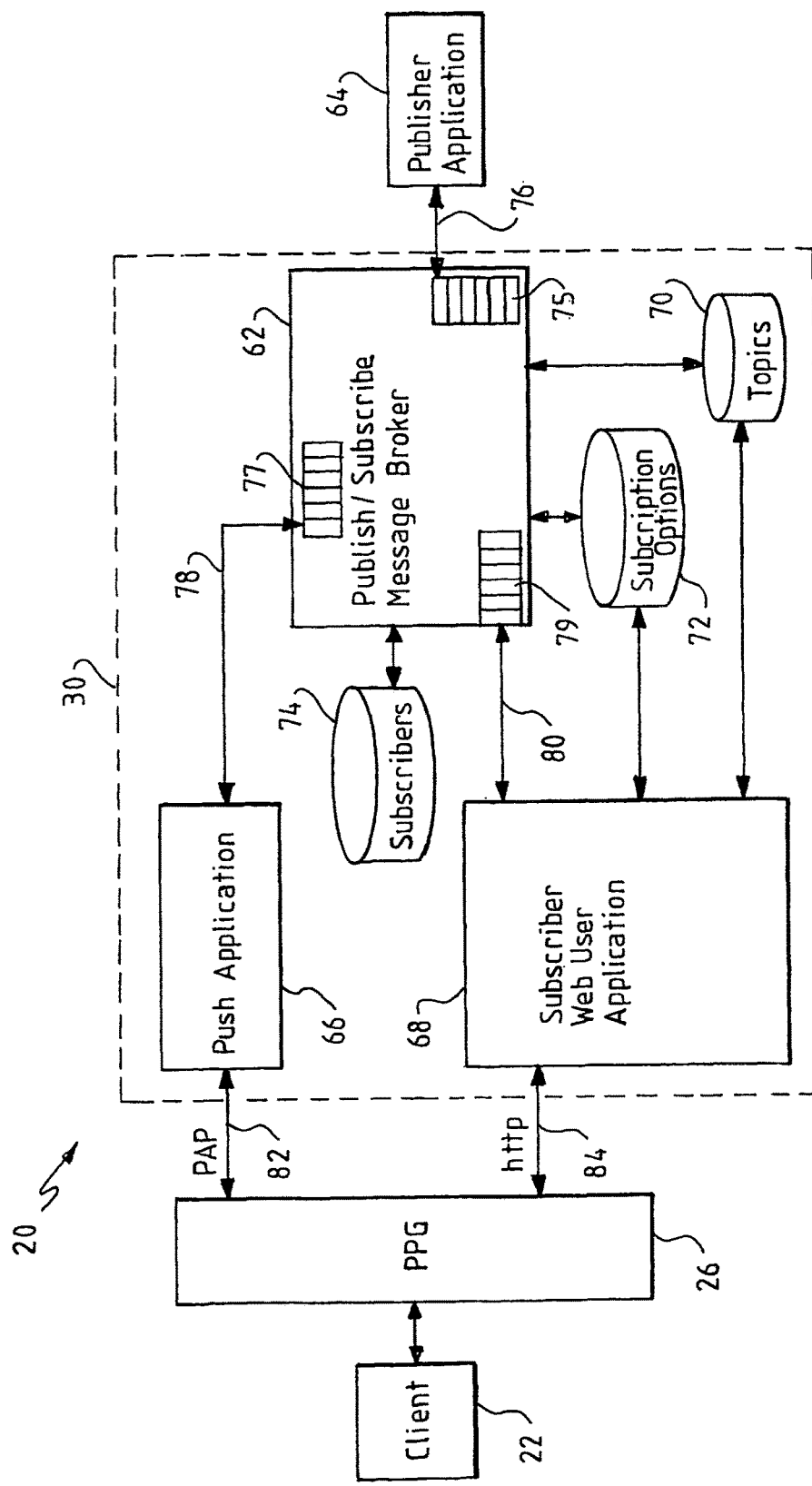
FIG. 6 is a further block diagram of a wireless messaging service of FIG. 4 illustrating an exemplary message queuing system.

FIG. 6 illustrates an exemplary MQ system 30 in system 20 for wireless messaging services in accordance with a preferred embodiment of the invention. MQ system 30 comprises a publish/subscribe/push message broker 62 coupled to one or more publisher applications (for example, publisher application 64) via message queue link 76 for receiving and transmitting publish-related communications. Broker 62 is further coupled to one or more applications for subscriber client communications. For example, broker 62 is coupled to push messaging application 66 via message queue link 78 and to subscriber web user application 68 via message queue link 80. Broker 62 is also coupled to one or more databases, namely topics database 70, subscription options logic database 72, and subscriber database 74.

Push messaging application 66 is coupled to PPG 26 via communications link 82 for push message communications using a protocol such as PAP.

Subscriber web user application 68 is coupled to each of the databases 70 and 72 and to PPG 28 via communications link 84 for web browser-based communications with client 22.

Though not shown, broker 62 comprises one or more nodes for brokering messages between publishers and subscribers. Broker 62 may also broker messages through communications with other brokers (not shown) in a brokering network as described above with reference to FIG. 2. Some of the nodes of broker 62 are configured for receiving publisher messages originating from at least one publisher application 64 via a message queue 75 and link 76. At least some of the publisher messages include requests to register the publisher application's intention to publish messages on a topic. At least some other publisher messages include content data defined by the topic for wireless delivery to one or more subscribers having a subscription for the content data. Additional publisher messages may include requests to delete from broker queues earlier publisher messages or requests to de-register a publisher's intention to publish on a specific topic. Broker 62 may transmit acknowledgements of such publisher messages or other messages to publisher applications. Additionally, broker 62 may store topic data in a database such as topics database 70, preferably grouped into streams, useful for presenting topic information to subscribers during the subscription process as discussed below.

Publisher messages including content data are routed to specific subscribers according to content subscriptions. A key benefit of content based subscription is the improvement in the granularity for the receiving application (i.e. wireless subscriber). It is understood that wireless subscribers require personalized messaging options primarily to filter messages for desired content and appropriate delivery. When designing a wireless messaging application, it is preferable to cater to many different subscriber scenarios. Therefore, particularly in the wireless context where very thin subscriber client applications are demanded, if subscribing to a particular published topic where different values in different fields can generate differing scenarios, the subscribing application could get very complex. Without content based subscription, the only way to reduce the granularity of the published messages, and thus simplify the receiving messages is to increase the number of topics available to a subscriber. However, this adds significant overhead and the definition of such topics can be difficult to specify.

With content based subscription a simple application can be built employing business logic to handle each identified scenario with subscribers subscribing to the same general topic but electing certain filter criteria according to a desired scenario. The subscribing application (i.e. client device) only receives a published message if the message matches the topic and the content of the message also meets any filter criteria according to the business logic selected by the subscription. In this way, each simple processing application within a broker which caters for the occurrence of a particular messaging scenario only gets executed when that particular scenario occurs. The primary logic needed to build the business logic for a scenario is to identify the fields within a message to analyze for a particular value or values. Then the publish/subscribe network itself routes the message to the subscriber without the need for additional customized logic.

Thus, some of the broker nodes are configured for processing publisher data messages including content data; filtering the data messages by topic and other filter criteria according to a subscriber's subscription and its associated business logic; and distributing messages for each subscriber having previously subscribed to the content data.

Preferably, a plurality of message scenarios for various topics (i.e. the business logic) can be mapped to message flows and the nodes of broker 62 may be constructed via a graphical message flow interface as previously described. The message flows may act as templates for a stream of specific topics. For example, assume that a publisher application offers a sports score update service. Individual sporting events for which the service is offered may define a topic (e.g. Basketball: Sharks vs. Jets, Sept. 15). Topics of a similar type (e.g. all basketball games) may be grouped within a stream for which predefined message flows implement the subscription options (i.e. filter criteria) for the message scenarios. Options may relate to a choice as to what data is to be provided in an update message and when to provide the update message. The options for a stream of topics can be stored in a database such as subscription options logic database 72. Subscription options logic database 72 may be useful for presenting subscription options to subscribers during the subscription process as discussed below, as well as for filtering published messages. It is understood that databases 70 and 72 may be combined as a single database.

Additionally, some of the nodes of broker 62 are configured for receiving a subscription for publisher data messages on a topic from at least one subscriber (e.g. client 22). FIG. 5 illustrates broker 62 in communication with a subscriber web user application 68 via message queue 79 and link 80, for facilitating subscription services. Subscriber web user application 68 enables clients, through wireless and, optionally, wired communications, to subscribe to content data. Subscriber web user application 68 presents subscription options and particular topics to wireless client 22 in accordance with WAP protocols, preferably via link 84 and PPG 26.

While the choice of subscription options remains generally static, the choice of topics is more fluid as publisher applications register their respective intentions to publish on a topic or de-register such intentions. Preferably, subscriber web application 68 is provided with current topic data and subscription options, such as through connections to databases 70 and 72, for automatic mapping of stream/topics and options to WML pages. By generating the pages from the topics and options on demand, the subscriber is always provided with the latest available offerings of the wireless messaging service. Developing such a mapping requires the mapping of topic data, typically arranged in a tree structure, to WML cards that are used to present the information to the WAP-enabled client device 22. In addition, templates could be used to provide more personalized browsing for subscribers.

Broker 62 further comprises nodes for forwarding messages for each subscriber to wireless delivery in accordance with the wireless push protocol. Broker 62 is coupled for communication, via a message queue 77 and link 78, with push application 66. Push application 66 is configured to accept the messages for each such subscriber and to transmit such messages to PPG 26 for wireless delivery. Push application 66 may convert the messages it receives into suitable wireless push protocol format acceptable to PPG 26, if this is not performed by broker 62.

Push application 66, like a push initiator described previously, transmits messages in WAP push format, typically of a service indication or service loading type, for delivery to the client device 22. Moreover, push application 66 is preferably able to support push message notification, cancellation, status query and client capabilities query in order to provide higher service quality within the WAP framework.

Though shown as a separate application of message system 30, the functionality of push application 30 may be performed by nodes of broker 62 having suitable plugins configured to use WAP APIs. Moreover, it should be understood that broker 62 may be co-located and/or integrated with PPG 26 such as via WAP APIs that may be available from proxy service 28 (FIG. 5). Similarly broker 62 may be co-located and/or integrated with subscriber web user application 68 and/or any publisher application. Moreover, MQ System 30 (FIG. 5) may be co-located and integrated with either PPG 26 and/or publisher application 64. Co-location and integration provides significant flexibility when designing services and systems. For example, when a wireless telephony provider offers messaging services to wireless subscribers, the provider may co-locate MQ System 30 with a PPG 26 and partner with publishers.

Figure 7:
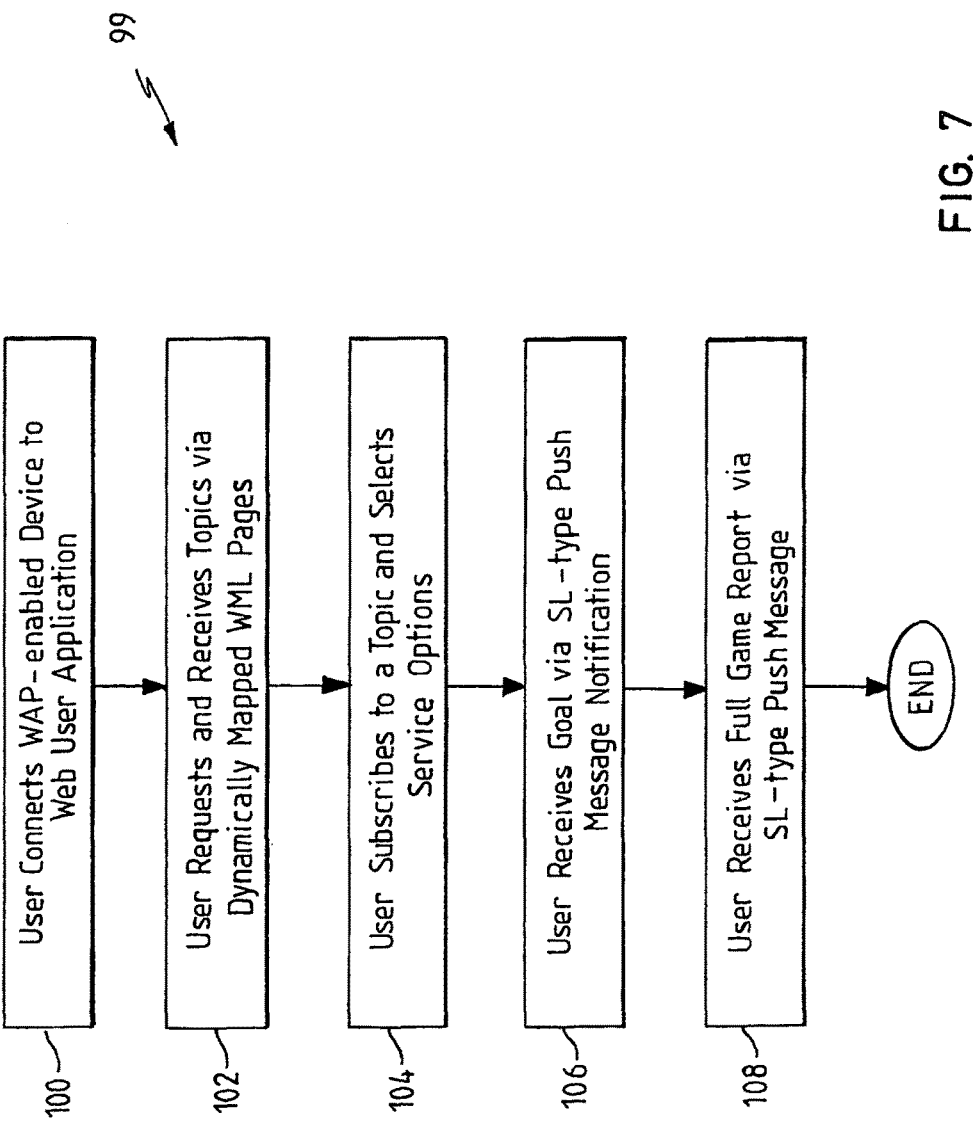
FIG. 7 is a flow chart illustrating a method of subscribing for and receiving messages in accordance with a preferred embodiment of the invention of FIGS. 5 and 6.

A wide variety of diverse message services can be implemented by system 20. For example a conference feature could be used to develop a chat room service where users interact in a manner similar to a conference call. Another example relates to an auctioning service, which enables users to bid and purchase items through their wireless devices. Operation of system 20 is described with reference to the sports score update service described above that provides users with notification regarding the status of a sports event. A service provider, such as a telecommunications company, may offer a number of services to users which include information on sports, stocks and news. The service provider implements a system 20 based on MQSeries publish/subscribe and WAP push and integrates publishing applications for the following streams and topics:

Sports
Soccer
    Bayern Munchen vs. Valencia (date: time)
Basketball
Stocks
NYSE
NASDAQ
News
Local
International FIG. 7 illustrates a flow chart for a method 99 of subscribing for and receiving wireless messages. From the perspective of a user/subscriber the following steps are followed to subscribe to and receive desired information. A user connects his or her WAP-enabled client device 22 via a predetermined URI to subscription web user application 68 (step 100). The user requests and receives web pages (i.e. WML cards) from user agent 24 providing the topics that are currently available for subscription (step 102). In step 104, user elects to subscribe to a soccer game that is to start in a few hours. During the subscription process, user selects various options to tailor the type of content and delivery (i.e. level of service) he or she wishes to receive. For example, the options may include the following:

Goal notification—receive goal particulars after each goal
Half time report—receive game summary particulars at half time and full time
Full game report—receive game summary particulars at full time User selects service levels 1 and 3 in response to the choices from web user application 68. In addition, the user can also specify whether to be prompted before receiving the content of these messages or automatically be presented with the messages. The user selects automatic mode in this example.

Figure 8:
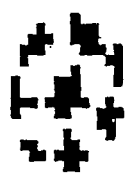
FIG. 8 is an example of a wireless messaging service message provided to a subscriber by a wireless messaging service in accordance with the preferred embodiment of the invention.

Assume that following the start of the game, player Mendieta wearing jersey number 6 for Valencia scores in the 16th minute. The user receives via client device 22 a push message including a MIME part of a service loading type from PPG 66 (step 106). The client device 22 automatically activates a service indicated by a URI of the push message and displays goal summary information such as that illustrated in FIG. 8. Thereafter, the game ends and Valencia wins with 1-0. User receives another report (not shown) that summarizes the game (step 108).

Figure 9:
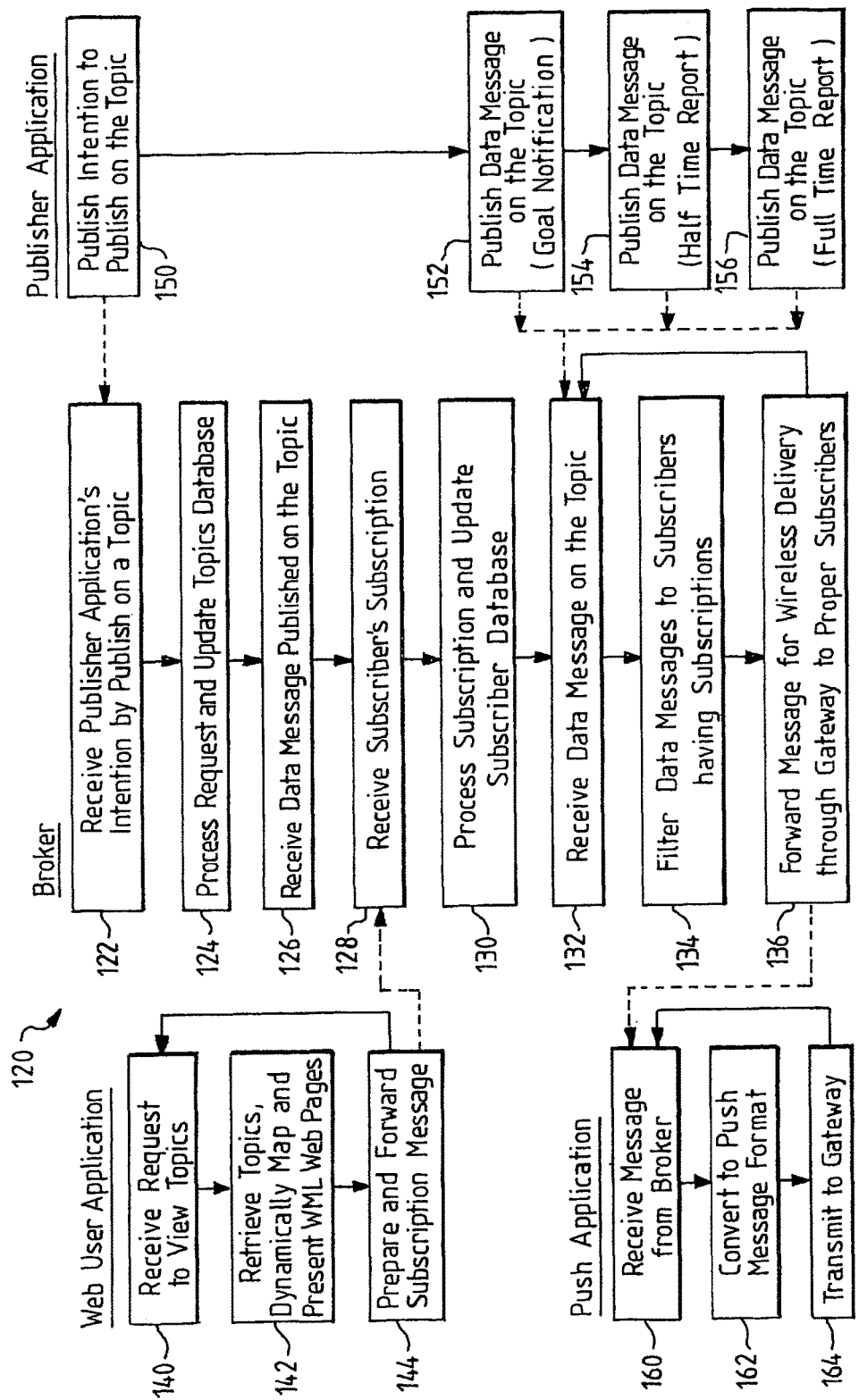
FIG. 9 is a method of brokering messages between publisher application and wireless subscribers in accordance with the preferred embodiment of the invention.

FIG. 9 is a flow chart illustrating a method 120 for brokering messages in accordance with a preferred embodiment of the invention. From the perspective of the service provider in this exemplary scenario, the following events take place. A publisher application 64 (FIG. 6) publishes a data message indicating an intention to publish information on the Bayern Munchen vs. Valencia soccer game topic (step 150). Broker 62 receives the intention to publish message (step 122), processes it and updates the topics database 70 (step 124). Some time later, in step 140, web user application 68 (FIG. 5) receives a request from the user's client device 22 to view available topics. Web user application 68 automatically generates a WML page of available topics retrieved from databases 70 and 72 and sends the URI to user (step 142). Web user application 68 prepares a subscription request message in response to user selections, including selected option criteria, and forwards the message including the subscription request to broker 62 via link 80 (step 144). In steps 128 and 130, Broker 62 receives the message, processes it and updates subscriber database 74.

During the game, publisher application 64 publishes (step 152) and broker 62 receives (step 132) a publisher data message on the subject topic (i.e. the Bayern Munchen vs. Valencia soccer game) with content data. The broker 62 filters the message according to the message flow logic and the subscription including service levels (i.e. filter criteria) retrieved from data messages 70, 72 and 74 (step 134), and forwards a message for the user to the push application 66 (step 136). The broker 62 then waits for additional data messages. Meanwhile, push application 66 receives (step 160) and converts the message (step 162), in compliance with the push protocol, to a WAP push message of a service loading type. Push application 66 transmits the push message to PPG 26 via link 82 using the push access protocol for wireless delivery to client 22 (step 164). A half-time message is also received by the broker 62, which is similarly filtered (step 132 to 136). However, as a result of the filtering, the message is not forwarded to the user as the user did not subscribe to the content of this message. The full game message received by the broker 62 is filtered and forwarded to the user (steps 132-136 for the broker 62 and steps 160-164 for the push application 66). The broker 62 and the push application 66 may receive and/or transmit acknowledgements (steps not shown) for service monitoring or as otherwise required by the wireless and/or publish/subscribe protocols.

Additional methods steps or system applications (not shown) may be incorporated to support a revenue model, for example by logging events for eventual customer billing, as is well understood in the art.

In accordance with a preferred embodiment of the invention message queuing publish/subscribe technology can be combined with a wireless push protocol to build and provide wireless messaging services for wireless application enabled devices. An existing reliable messaging system may be deployed, with modifications, as the middle layer between the backend publisher application that provides content data and the client application that subscribes to and consumes the content data.

Though the preferred embodiment of the invention is described using WAP, alternate protocols for implementing wireless applications and for providing wireless push communication may also be deployed. It may be further understood that other markup languages, such as cHTML, may be used rather than WML as specified by WAP. For example, subscription topic data may be dynamically mapped to cHTML format or a published message may be pushed to wireless client 22 with a URI directing the device 22 to access a cHTML page or other document.

Moreover, with reference to FIGS. 5, 7 and 9, the steps of subscribing are described using a web user application 68 that automatically maps topic data to WML pages for dynamic presentation via a web interface to a subscriber. Alternate subscription models may also be employed. For example, a wireless device may run a client subscription application for displaying and selecting subscriptions. Such a device may store some or all of the subscription offerings (i.e. topic data) locally. The device may periodically connect to a subscription server application (not shown), which need not be web-based, and perform a data synchronization to obtain current topic data and provide subscriptions to the server. The data synchronization may be in accordance with a proprietary protocol or, preferably, with an open industry standard protocol for mobile data synchronization such as the SyncML protocol. The connection between the wireless client device and the server may be a wireless connection (e.g. WSP/WAP, IrDA, Bluetooth, etc.) or wired connection (USB, HTTP/Internet/Intranet).

The a preferred embodiments of the invention may also be useful with wireless devices capable of running Java™-based applications in a Java™ application environment such as Sun Microsystems' Java™ 2 Platform, Micro Edition (J2ME™ Platform). J2ME offers a small application environment (a virtual machine, core libraries and a device and/or industry type profile) suitable for smart wireless devices.

In accordance with one aspect of the preferred invention, a Java user application may be developed for wireless client device 22. The device may receive-push messages for the Java application in accordance with a subscription. The messages may provide data for the Java application or be useful for controlling and/or configuring the application.

While the client device 22 of the preferred system is described as having a WAP user agent and browser for subscribing to a topic, receiving push messages published on the topic and acting on the received messages, it may be understood that the browser functionality particularly may be provided by a Java-based application as well.

It is important to note that a wireless client 22 which supports service loading type messages, that is, messages for automatically initiating a service or for invoking, controlling or configuring a resident application (e.g. a Java-based application), is subject to certain attacks. Preferably, a security policy may be implemented to protect the device 22.

The invention claimed is:

1. A method of brokering messages between a publisher application and at least one wireless subscriber using a combined publish/subscribe and push paradigm, the method comprising steps of:
   receiving, within a message oriented middleware (MOM) message queuing system of a publish/subscribe message broker providing asynchronous message transfer services between applications in a time independent fashion, a data message published on a topic from the publisher application, the message queuing system implementing a combined publish/subscribe and push paradigm; and
   using a push access protocol (PAP) type wireless push protocol by the message queuing system to communicate with a server proxying a push message provider to direct the push message provider proxied by the server to distribute the data message over the air (OTA) to a wireless subscriber that has subscribed for messages on the topic about which the data message was published.

2. The method as claimed in claim 1 wherein using the wireless push protocol to distribute further comprises filtering the data message according to the topic about which the data message was published.

3. The method as claimed in claim 1 wherein using the wireless push protocol to distribute further comprises filtering the data message using business logic related to the topic of the data message, a content of the data message and a subscription of the subscriber.

4. The method as claimed in claim 3 wherein the business logic controls the flow of the message.

5. The method as claimed in claim 1 further comprising receiving a subscriber data message comprising a subscription request from the subscriber, requesting that the subscriber receive messages on the topic upon which the data message is published by wireless delivery using a push protocol and wherein the subscriber message is received from a user application for facilitating subscription requests.

6. The method as claimed in claim 5 further comprising providing topic data to the user application which communicates the topic data to the subscriber.

* * * * *